(12) United States Patent
Carpenter et al.

(10) Patent No.: US 7,004,159 B1
(45) Date of Patent: Feb. 28, 2006

(54) CONVEYING COOKING OVEN AND METHOD

(76) Inventors: Keith R. Carpenter, 1801 W. Bakerview Rd., Bellingham, WA (US) 98226-9105; Harry E. Hegarty, 3969 Jones La., Bellingham, WA (US) 98225; Larry Johnson, 3475 Willowwood Rd., Bellingham, WA (US) 98225

( * ) Notice: Subject to any disclaimer, the term of this patent is extended or adjusted under 35 U.S.C. 154(b) by 311 days.

(21) Appl. No.: 10/456,184

(22) Filed: Jun. 6, 2003

Related U.S. Application Data

(60) Provisional application No. 60/386,983, filed on Aug. 27, 2002.

(51) Int. Cl.
*A21B 1/02* (2006.01)
*F24C 15/00* (2006.01)

(52) U.S. Cl. .................. 126/19 R; 99/443 C

(58) Field of Classification Search .............. 126/19 R, 126/21 R, 21 A, 41 C, 273 R, 273.5, 39 C, 126/39 F, 39 B; 99/443 C, 443 R; 219/388, 219/392, 398

See application file for complete search history.

(56) References Cited

U.S. PATENT DOCUMENTS

| | | | | | |
|---|---|---|---|---|---|
| 3,767,829 | A | * | 10/1973 | Karr ........................... | 426/405 |
| 3,993,788 | A | * | 11/1976 | Longenecker ............. | 99/443 C |
| 4,833,301 | A | * | 5/1989 | Furtek ........................ | 219/388 |
| 4,951,648 | A | * | 8/1990 | Shukla et al. ............. | 126/21 A |
| 5,323,485 | A | * | 6/1994 | Josefsson et al. ........... | 219/388 |

FOREIGN PATENT DOCUMENTS

| | | |
|---|---|---|
| FR | 2 454 596 A * | 12/1980 |
| WO | WO 93/04328 A1 * | 3/1993 |

* cited by examiner

*Primary Examiner*—Josiah C. Cocks
(74) *Attorney, Agent, or Firm*—Michael F. Hughes; Hughes Law Firm, PLLC

(57) ABSTRACT

A cooking oven having a cooking chamber with a rear entry portion and a forward exit portion. There is a conveying platform extending along the length of the cooking chamber, and this platform comprises stationary elongate platform members and moveable platform members, with the two groups of platform members being spaced in an alternating relationship next to each other. The moveable platform members move together in a cycle upwardly, through a forward increment of travel, downwardly, and rearwardly to its original position and upwardly, thus conveying food products. There is a heating chamber below the platform and also infrared heaters above the platform, which are arranged to apply heat to food product on the platform with different patterns of intensity.

1 Claim, 10 Drawing Sheets

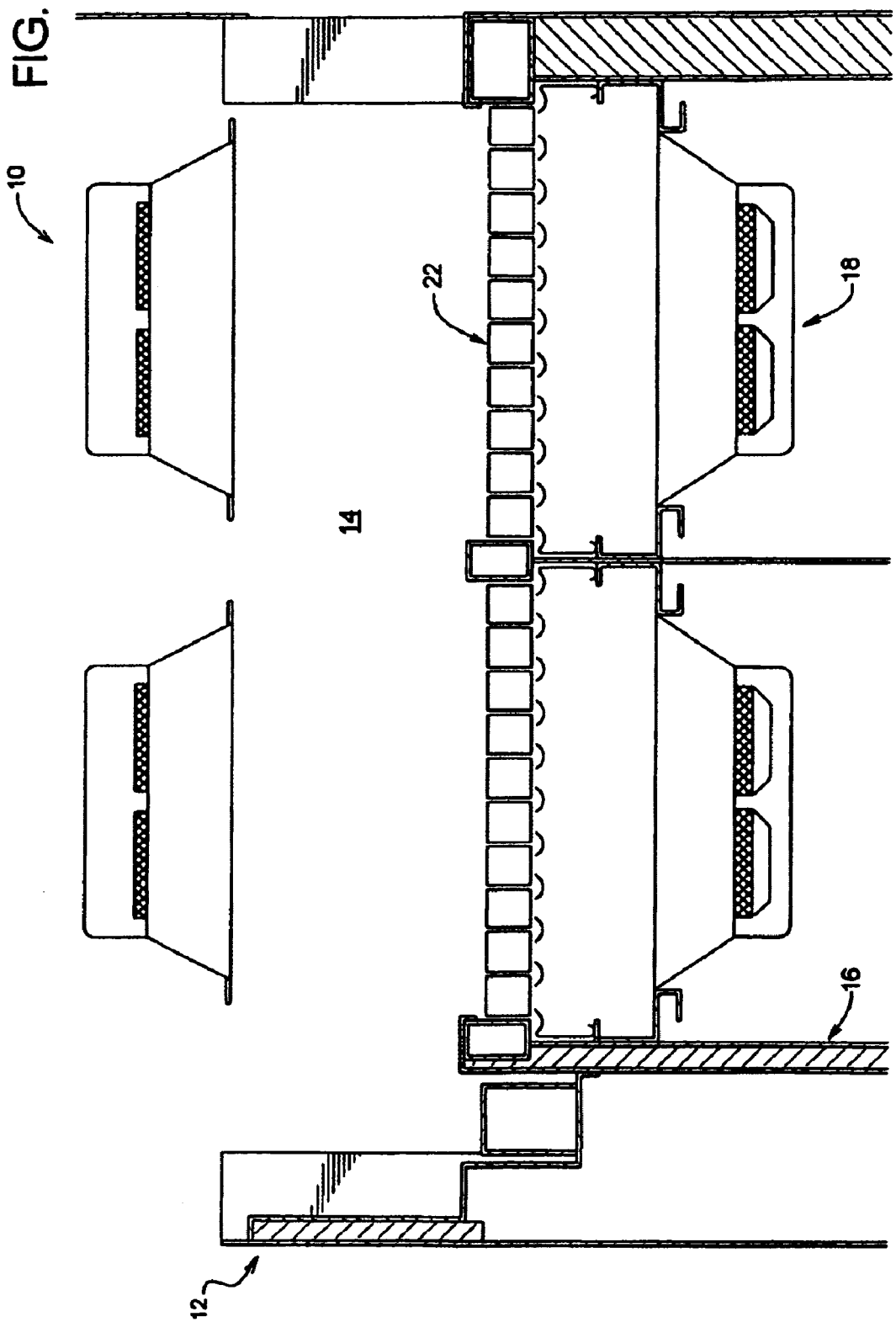

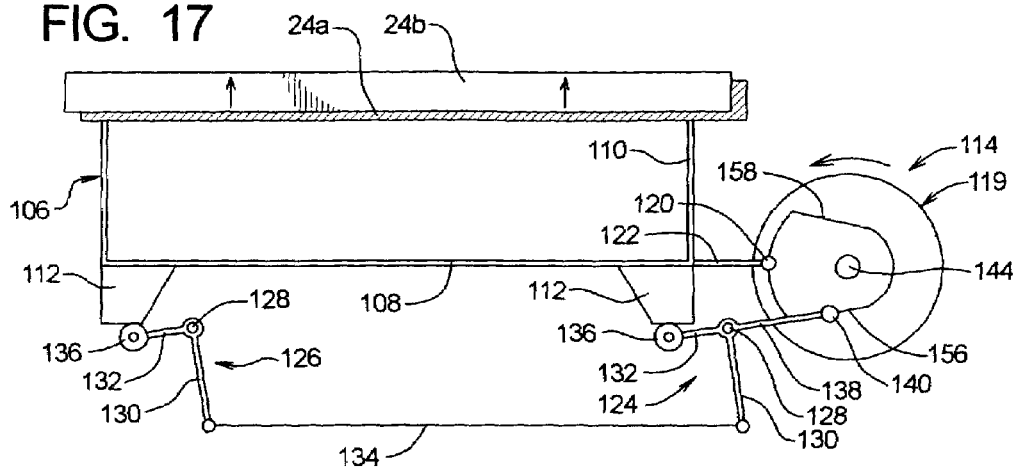
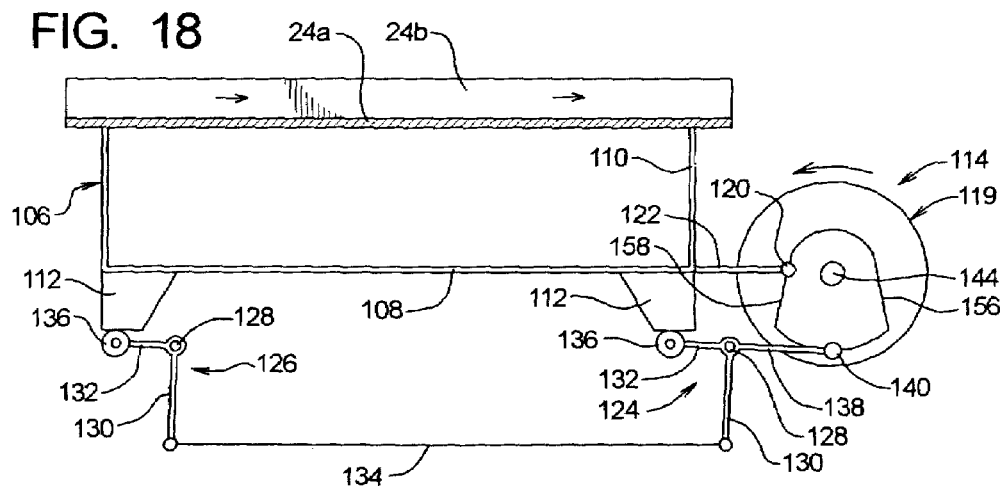
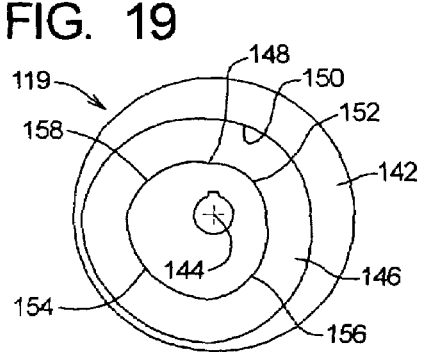

– continued –

CONVEYING COOKING OVEN AND METHOD

RELATED APPLICATIONS

This application claims priority benefit of U.S. Provisional Ser. No. 60/386,983, filed Aug. 27, 2002.

FIELD OF THE INVENTION

The present invention relates to a cooking oven and a method related to the same, where the food product to be cooked is inserted into an entryway of the oven and travels through the oven during a cooking period and leaves the oven chamber from an exit.

BRIEF DESCRIPTION OF THE DRAWINGS

FIGS. 15–18 are four sequential drawings illustrating the operation of the drive mechanism for the conveying platform;

FIG. 19 is a view looking at an operating surface of a drive cam member;

FIG. 20 is an isometric view of the drive cam member of FIG. 19;

DETAILED DESCRIPTION OF THE EMBODIMENTS

Figures 1, 3A:
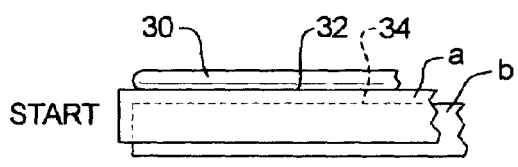
FIG. 1 is a sectional view of the oven of the present invention taken along a vertical plane which is transversed to the longitudinal travel axis of the oven.
FIG. 3a is a series of schematic side elevational views of the platform, showing the stationary platform elements and the conveying platform elements, with the conveying platform elements being shown in their various positions during a conveying cycle.

Reference is first made to FIG. 1, which shows the entire oven 10 which comprises an oven housing 12 which defines a cooking chamber 14. The housing 12 is supported by a base structure 16, and there is positioned in the lower part of the base structure 16 a burner section 18.

There is a cooking platform assembly 20 which comprises a conveying platform section 22 which extends along the bottom of the chamber 14. The conveying platform section 22 comprises a plurality of longitudinally extending platform elements 24 which extends from a rear entry end portion 26 of the oven 10 to a front exit end portion 28 of the oven 10. These platform elements 24 in turn comprise a plurality of stationary platform elements designated 24a and a plurality of conveying platform elements 24b. These stationary and conveying platform elements 24a and 24b are located side-by-side in an alternating pattern so that each stationary platform 24a is positioned adjacent to two conveying platform elements 24b and each conveying platform element 24b is adjacent to two stationary platform elements (except, of course, for the two outside platform elements 24).

The particular construction of these platform elements 24 will be discussed in more detail later in this text, and will at this point be described only briefly as to their overall configuration. Each platform element 24 has a uniform square cross-sectional configuration along its entire length, and also extends along substantially the entire length of dimension of the housing 12.

The stationary platform elements 24a (as their name suggest) are fixedly mounted in the housing 12 and extend horizontally in a longitudinal direction. Each of the conveying platform elements 24a are positioned so that they move through a series of conveying cycles to move a food product progressively through the cooking chamber 14 from the entry end portion 26 to the exit end portion 28. The manner in which this is accomplished will now be described with reference to FIG. 3a and FIG. 3b.

Figures 1, 3B:
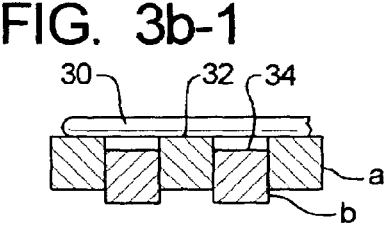
FIG. 3b is a series of end elevational views showing the stationary platform elements and the conveying platform elements in their various positions during a conveying cycle.
Figures 2, 3A:
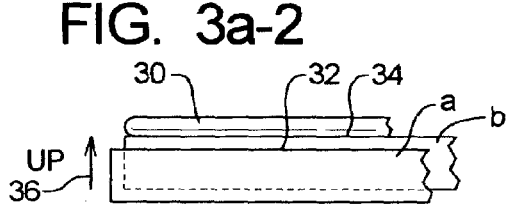
Figures 2, 3B:
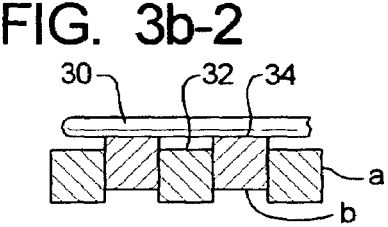

To avoid having FIG. 3a and FIG. 3b becoming cluttered too much with numerical designations, the stationary platform elements 24a will simply be designated by the letter "a", and in a like manner the conveying platform elements 24b will be designated simply by the letter "b".

At the top part of FIG. 3a and FIG. 3b, there is simply shown schematically a food product 30 which, for the sake of example, will be considered to be a pizza 30. In FIG. 3a-1, the pizza 30 is shown as being at the rear entry portion of the conveying platform section 22, and it can be seen that the upper surface 32 of each of the stationary platform elements 24a is located above the upper surface 34 of each of the conveying platform elements 24b. At FIG. 3a-1 and at corresponding FIG. 3b-1, the food product 30 (e.g. the pizza) is positioned at the rear entry portion and is ready to moved on its path of travel through the oven. The first step in a single conveying cycle is to move the conveying platform elements 24a upwardly (as indicated by the arrow 36) so that the upper surfaces 34 of the conveying elements 24b are positioned above the upper surfaces 32 of the stationary platform elements 24a. This raises the pizza 30 off of the upper surfaces 32 of the stationary platform elements 24a. The next step in the cycle (see FIG. 3a-2) is for the conveying platform elements 24b to move in a forward direction (from left to right in FIG. 3a) as indicated by the arrow 38. With the pizza 30 being supported by the surfaces 34 of the conveying platform elements 24b, this carries the pizza 30 forward by incremented travel.

When the conveying platform elements 24b complete this forward increment of travel, the conveying platform elements 24b are moved downwardly so that the upper surfaces 34 of the conveying platform elements 24b are below the upper surfaces 32 of the stationary platform elements 24a. In this position, the pizza 30 now rests on the upper surfaces 32 (See FIG. 3a-4 and 3b-4, and arrow 40) on the stationary platform elements 24a. It can be seen by viewing FIG. 3a-4 that the pizza 30 has now completed a forward increment of travel.

Next, as shown in FIG. 3a-5 and FIG. 3b-5, the conveying platform elements 24b are moved rearwardly (see arrow 42) to their original position as shown in FIG. 3a-1 and FIG. 3b-1.

Figure 2:
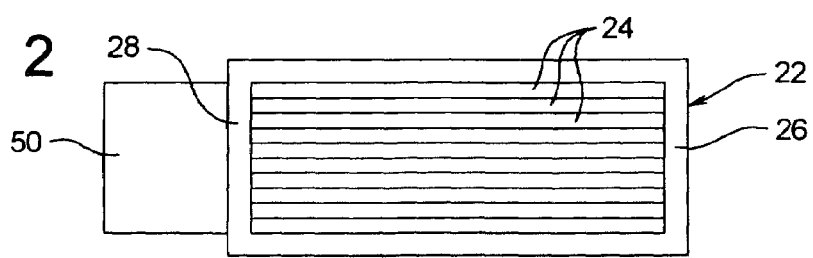
FIG. 2 is a top plan view showing only the cooking platform of the present invention and the attached exit platform, these being shown somewhat schematically.

To start a second cycle, the next step, as shown in FIG. 3a-6 and FIG. 3b-6, is to move the conveying platform elements 24b upwardly (arrow 44) as shown in FIG. 3a-2 and FIG. 3b-2. This raises the pizza 30 off of the upper surfaces 32 of the stationary platform elements 24a.

Figures 3, 3A:
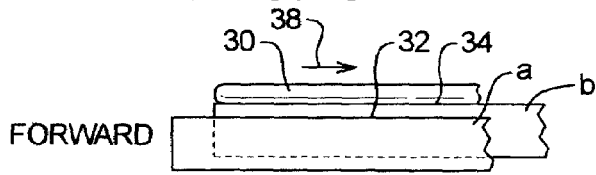
Figures 3, 3B:
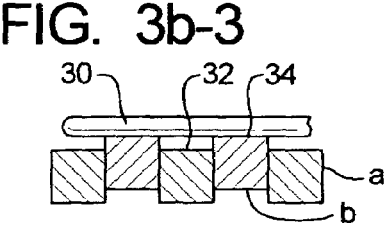
Figures 3, 3A, 4:
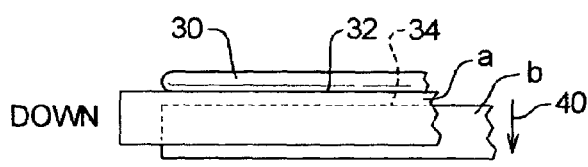
FIG. 4 is an isometric view showing the exit platform of the oven.
Figures 3, 3B, 4:
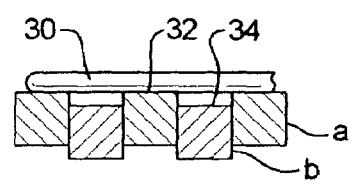
Figures 3, 3A, 4, 5:
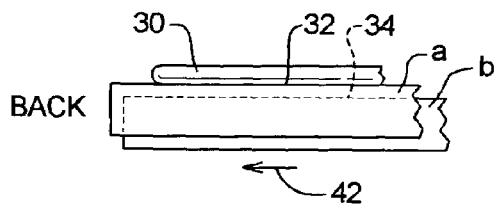
FIG. 5 is an isometric view showing a heat distribution plate of the oven.
Figures 3, 3B, 4, 5:
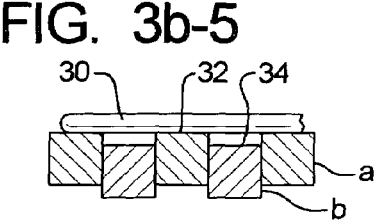
Figures 3, 3A, 4, 5, 6:
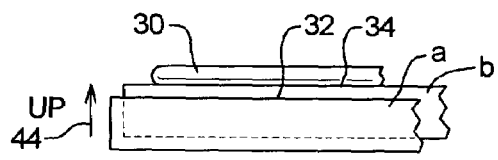
FIG. 6 is an isometric view showing one of the platform elements of the oven.
Figures 3, 3B, 4, 5, 6:
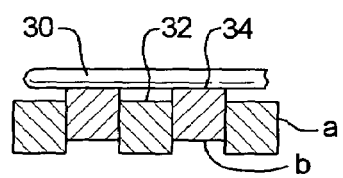
Figures 3, 3A, 4, 5, 6, 7:
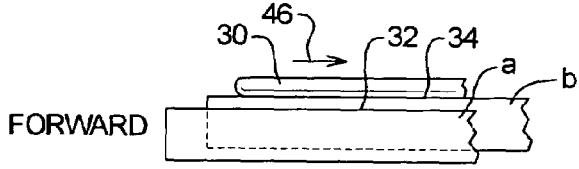
FIG. 7 is a top plan view of the platform element of FIG. 6.
Figures 3, 3B, 4, 5, 6, 7:
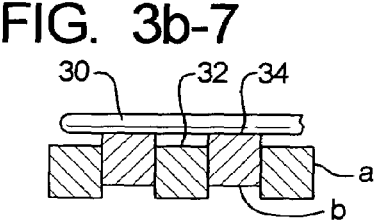
Figure 4:
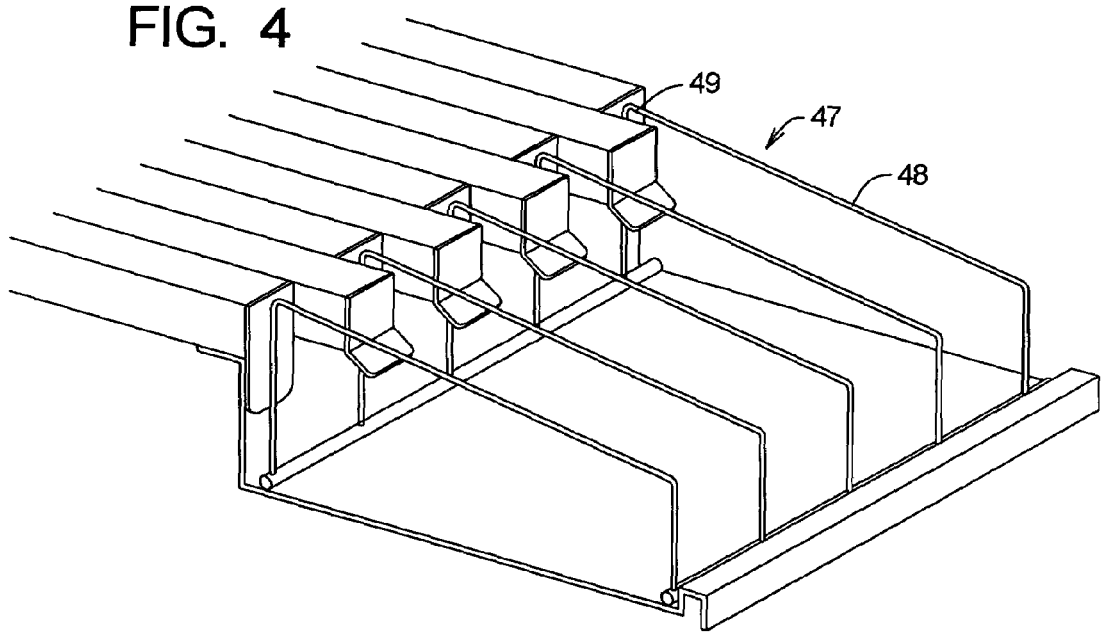
Figure 6:
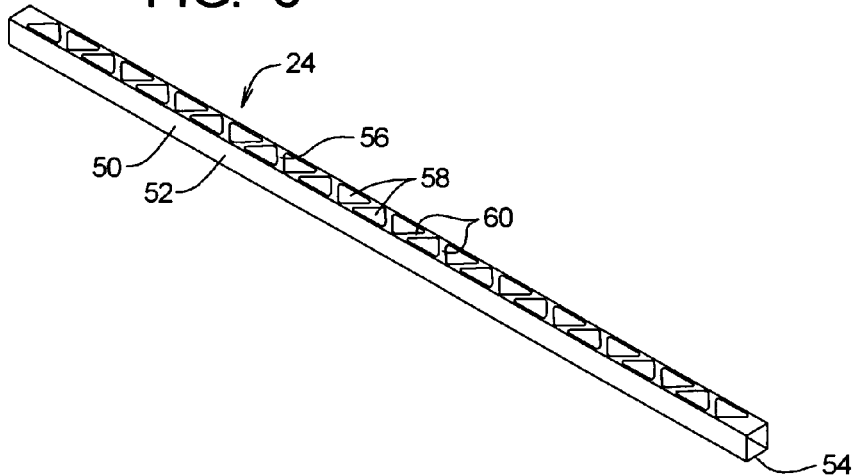
Figure 7:
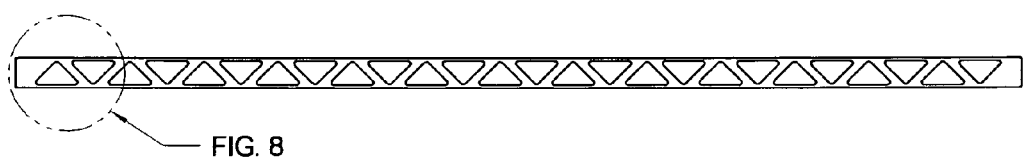
Figure 8:
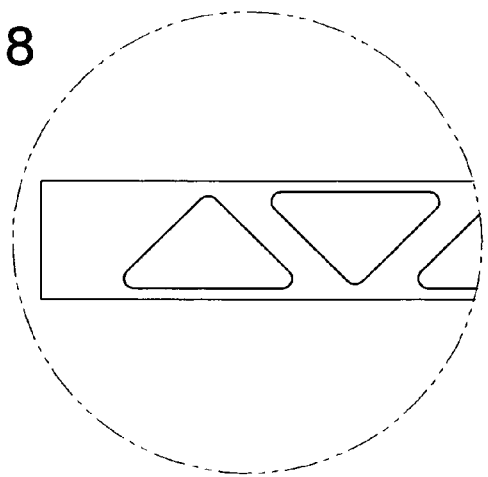
FIG. 8 is a top plan view, drawn to an enlarged scale, showing an end portion of the platform element enclosed in a circular broken line and indicated by the numeral VIII.
Figure 9:
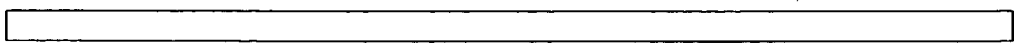
FIG. 9 is a bottom plan view of the platform element of FIG. 6.

As shown in FIG. 7, the next step is for the conveying platform elements 24b to be moved forwardly (arrow 46), in the same manner as shown in FIG. 3a-3 and FIG. 3b-3. This moves the pizza 30 forwardly through another increment of forward travel in the oven chamber 14. Then the conveying process continues as described above. It is evident that as this process continues, the pizza 30 (or other food product) is carried forwardly through the oven toward the exit end portion 28.

The movement of the conveying platform elements 24b can be accomplished in various ways. For example, the opposite ends of each of these conveying platform elements 24b could be connected to suitable actuating mechanisms which are linked to one another so that both follow the same movement pattern, and there could be a cam action as part of the overall linkage which could control this movement.

When the pizza 30 (or other food product) reaches its end limit of travel, the food product is moved onto an exit support member, and such exit support member is shown at 47 in FIG. 4. As shown herein, this comprises a plurality of wire members 48 having rear ends 49 connected to the platform section 22, and each of the wires has a downward and forward slant. As the food products are moved along the conveying platform section, these move from the platform section 22 onto the wires where they can be picked up by a person and be moved from the oven location.

A heat distribution section can be positioned above the burner section 18 and just below the conveying platform section as shown in FIG. 1. This section may have a plurality of parallel elongate members which extend beneath the conveying platform section 22 and these distribute the hot combustion gases and air from the burners more evenly against the conveying platform section 22.

Other components which could be incorporated in various ovens are shown in FIG. 1. However, since these are a large part known in the prior art, these will not be described in detail herein.

Reference is now made to FIGS. 6–9 to describe in more detail the platform elements 24. As an introductory comment, one type of oven which has become popular in recent decades, is an oven that has a stone or stone-like material which forms the platform. For various food products (e.g. pizzas), with the cooking being accomplished by having the products on the stone surface, there is provided a character or a quality to the products which many people have found desirable. Thus, these stone hearth ovens are commonly used in pizza parlors and restaurants, sometimes in conjunction with various enhancements, such as burning a fuel inside the oven chamber (e.g. wood pieces, charcoal, etc.).

Accordingly, one of the goals of the present invention is to provide this conveying oven in such a way that this same character of a stone hearth cooking surface can be obtained. Further, it is a feature of the present invention that this can be done not only in a manner to obtain the benefits of the stone or stone hearth mode of cooking, but also to make certain improvements in the same.

To describe the manner in which these platform elements are made, reference is first made to FIG. 6 which shows an outer metal shell 50 which defines the configuration of the platform element 24. This shell 50 has the square cross-sectional configuration with side plates 52, a bottom plate 54, and an upper plate 56 that is made with a plurality of triangular cutouts 58 in the form of isosceles triangles formed in a pattern so that there is a series of slanting strips 60 meeting at end portions at the upper edges of the side walls 52 in a pattern that forms a series of interconnecting "V" shaped pairs of segments. Thus, this is a "zig-zag" pattern of interconnecting members at right angles to each other, and at 45° to the longitudinal axis. Then a stone material in a molten state is poured into the metal shell 50 up to the level of the upper surface of the strips 60 to form a stone support surface.

Thus, the major part of the upper exposed surface of each of the platform elements 24 is a stone surface, and thus, the contact of the stone surface with the food product is obtained. Beyond this, however, it will be noted that the upper stone surface of each platform element 24 is in contact with the bottom surface of the food that is being cooked only half of the time, since the food product (e.g. a pizza) is supported half the time by the stationary platform elements 24a and half the time by the conveying platform elements 24b. Further, with each food product being essentially picked up, moved forwardly, moved downwardly, etc., different portions of the food product will come into contact with different surface portions of the platform elements 24. This creates greater uniformity of temperature at the upper surface areas of the elements. It will sometimes happen with conventional stone hearth ovens, that when a cold or room temperature food product is placed on the stone hearth surface there will be a temporary cooling of that portion of the stone surface, and this can be continued if one food product is taken off and another one immediately placed in the same location. This problem can be alleviated at least to some extent by the present invention.

Figure 10:
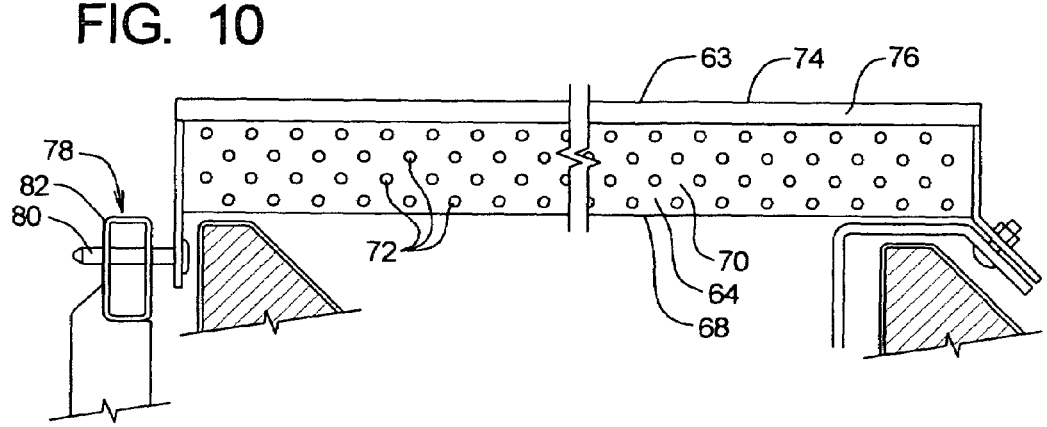
FIG. 10 is a side elevational view of a second embodiment of one of the platform elements of the present invention.
Figure 11:
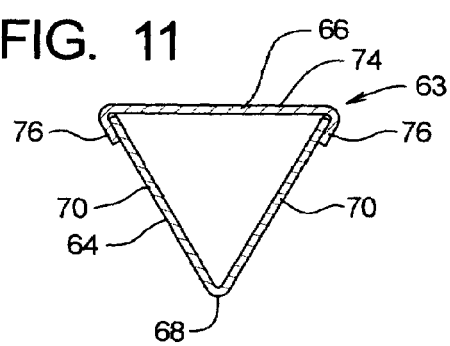
FIG. 11 is a sectional view taken along line 11—11 of FIG. 10.

Another configuration of the platform elements is shown in FIGS. 10 and 11, and these are designated 63 (with only one of these elements 63 being shown in FIGS. 10 and 11). It can be seen that this element 24a is made up of two metal components, namely a lower V-shaped component 64 and an upper horizontal cover cap member 66. FIG. 11 shows the element 63 in cross-sectional configuration, and it can be seen that the apex 68 is in a lower location, and then the two side walls 70 diverge in an upward direction. There are vent openings 72 throughout the side walls 70. The top member 66 has a planar horizontal upper surface 74 that has two laterally positioned inturned lips 76 to engage the upper end portions of the lower member 64.

This platform element 63 is made entirely of metal (e.g., stainless steel) so it conducts heat rather rapidly. This can be used possibly throughout the platform. Alternatively, the platform element 63 could be used only in specific locations where more immediate heat transfer would be needed. At the left hand of the platform element 63, as seen in FIG. 10, there is a mounting device 78 which permits for expansion and retraction of the element 24a due to different temperatures. This comprises an end support pin 80 which is mounted in a header 82. The pin 80 can move back and forth in the bracket 82.

Figure 12:
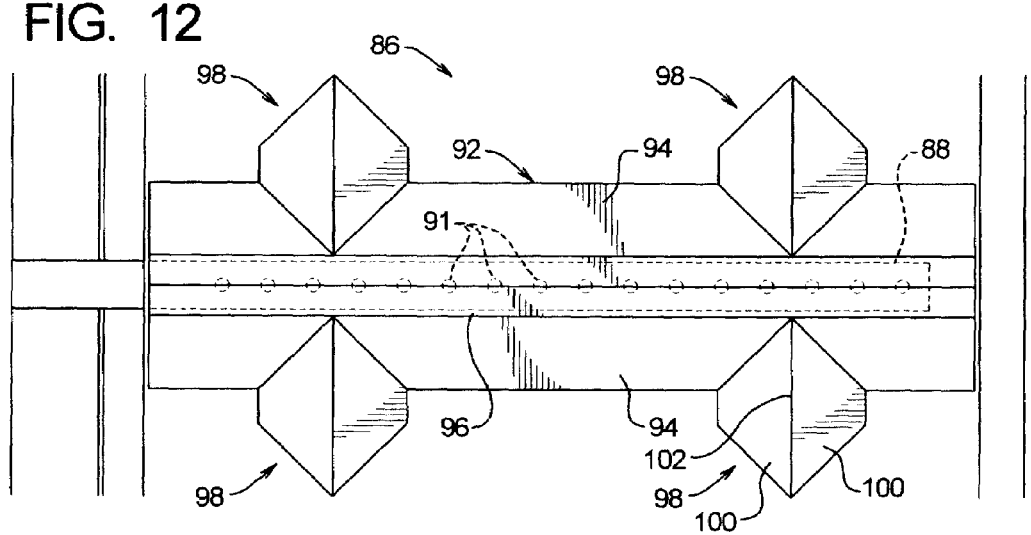
FIG. 12 is a top plan view of a heat distribution and shielding structure.
Figure 13:
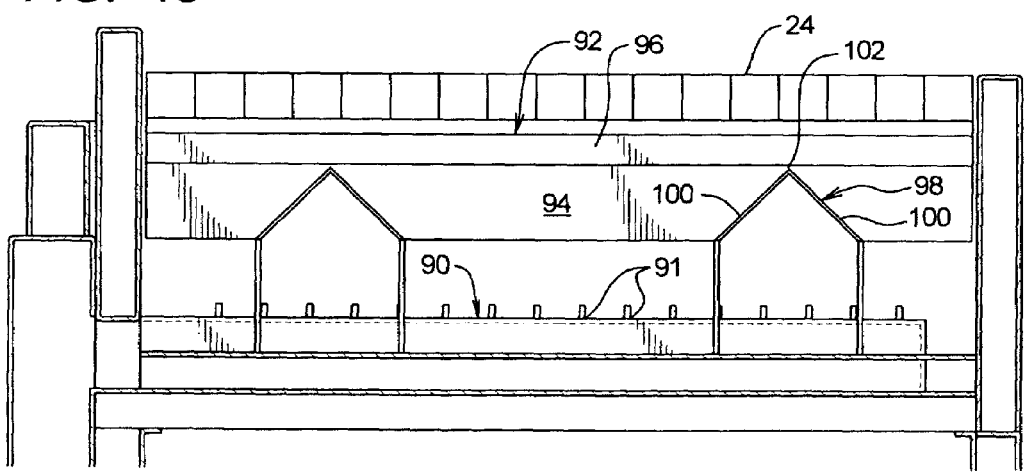
FIG. 13 is a side elevational view of the structure of FIG. 12.
Figure 14:
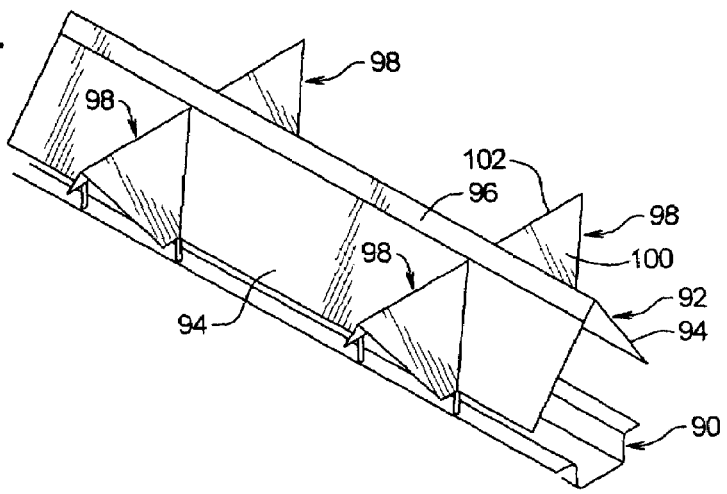
FIG. 14 is an isometric view of the structure of FIGS. 12 and 13.

Reference is now made to FIGS. 12, 13, and 14 to describe a shielding and heat distribution structure 86. In this particular arrangement, the heating source which is positioned below the platform section 24 comprises a plurality of heating sections 88, one of which is shown in FIG. 12 in plan view. This comprises a transverse support structure 90, in which are mounted a plurality of heating components 91 in the form of outlets for a gaseous fuel, such as propane or natural gas. A plurality of these units 88 are positioned at spaced locations along the length of the oven. The shield and heat distribution structure 86 comprises a main transverse cover section 92 which, as can be seen in FIG. 14, has a cross-sectional shape of an inverted "V", comprising two downwardly and outwardly extending side walls 94. There is a V-shaped cap member 96 joining the two upper edges of the side members 94. There are four heat distribution members 98 which are mounted to the main transverse section 92. Each of these sections 98 have in cross-sectional configuration an inverted V-shape comprising two side walls 100. The two side walls extend upwardly toward one another to a top ridge location 102. This structure protects the heating components 91 from, for example, falling food products, and enables better heat distribution.

Previously in this text, the movement of the platform elements 24a and 24b was described with reference to the sequential figures shown in FIGS. 3a and 3b. The drive mechanism by which these motions are accomplished will now be described with reference to FIGS. 15–22.

Figure 15:
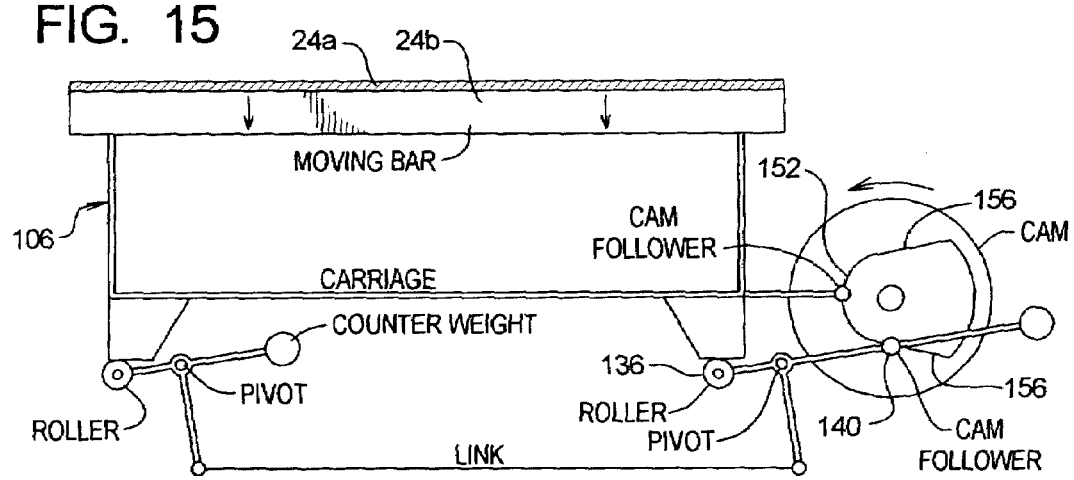

The overall operation of the drive mechanism 104 is shown in the four sequential views of FIGS. 15–18, and also reference to FIGS. 19 and 20 which illustrate the cam drive. In FIG. 15, there are words printed on the drawing indicating the various components, so for convenience of illustration, the numerical designations will be not appear in detail in FIG. 15, but shall be given in FIG. 16 which is immediately below.

Figure 16:
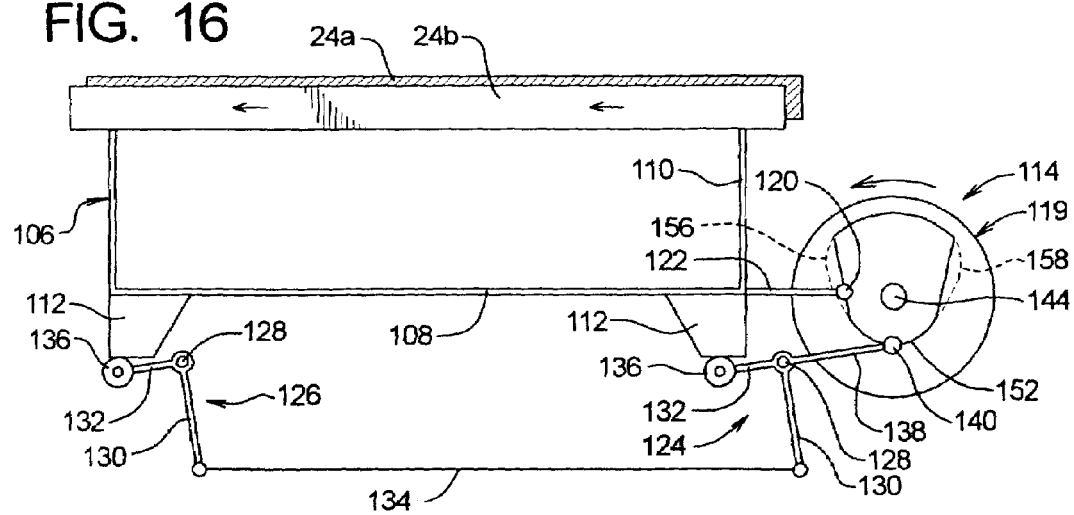

As indicated earlier in this text, the platform 22 is made up of platform elements 24 which are in the form of elongate bars, which in the first embodiment of the present invention are shown as having as having a rectangular cross-section. These platform elements comprise stationary platform elements 24a and conveying platform elements 24b. These are positioned next to each other in an alternating pattern. In FIG. 16, the conveying element 24 which is shown entirely as the conveying platform element 24b. The stationary platform element 24a which is immediately behind the element 24b is only partially shown, and for contrast the element 24a has been given dark shading. This is also done in FIGS. 15, 16, 17, and 18.

The conveying platform elements 24b are supported by a platform carriage 106 which comprises lower horizontally extending frame members 108 and vertical end frame members 110 which connect to the moveable conveying platform elements 24b. There are four support blocks 112 located at the front and rear ends of the carriage 106. There is a cam drive system by which the carriage 106 which is moved through the various stages of the conveying operation by a cam drive system designated 114. This drive system 114 comprises a horizontal drive section 116 that moves the carriage 106 (and thus also moves the conveying platform members 24b) back and forth horizontally, and a vertical drive section 118 which moves the carriage 106 vertically up and down. There is a cam drive member 119 which drives both of the drive sections 116 and 118. The cam drive member 119 is shown schematically in FIGS. 15–18, but is shown more accurately in FIGS. 19 and 20.

To describe the horizontal drive section 116, this comprises a cam follower 120 which connects to a rod 122 extending horizontal therefrom to connect to a lower forward end of the carriage 106. As will be described more completely later herein in a more detailed description of the cam drive member 119, this cam follower 120 imparts a horizontal back and forth motion through the carriage 106.

The vertical drive section 118 comprises forward bell cranks 124 and 126, each mounted at a stationary pivot location 128. Each bell crank 124 and 126 comprises first and second arms 130 and 132, respectively, with each pair of arms 130 and 132 being rigidly connected to one another at a 90° angle. The lower ends of the first arms 130 are pivotally connected to opposite end portions of a horizontally rigid link or connecting rod 134. It can be seen that the two arms 130 and the connecting rod 134 effectively comprise a parallel linkage so that the two bell cranks 124 and 126 move together so that the arms 130 remain parallel with one another. At the outer ends of the second arms 132 there are rollers that bear against lower horizontal surfaces of the support locks 112.

The more forward crank arm 124 is driven from the cam drive member 119, and to accomplish this, the second arms 132 of the forward crank member 124 is connected rigidly to a forwardly extending drive arm 134, that is in turn connected at its forward end to a cam follower 140. As will be described more fully hereinafter, this cam follower 140 moves upwardly and downwardly about the forward pivot location 128 of the forward bell crank 124, and this in turn causes the front and rear rollers 136 to move downwardly and upwardly, respectively.

The cam drive system 114 which is described thus far comprising the cam drive member 119 and the components 120 through 140, as described above, could be duplicated on opposite sides of the platform 24. Thus, there would be two cam drive members 119 on the opposite sides, and interconnected by a single drive shaft to ensure that the cam drive members 119 rotate synchronously. In the present embodiment, there is only one cam drive member 119 that is centrally located.

To describe in more detail the cam drive member 119, reference is now made to FIGS. 19 and 20. As stated previously herein, in describing the operation with reference to FIGS. 15–18, the contours of the cam portion of the cam drive member 119 are not shown accurately in FIGS. 15–18 for ease of illustration.

With reference now to FIGS. 19 and 20, the cam drive member 119 comprises a main body 142 having the configuration of a flat disc and having a center of rotation 144. A cam groove 146 is formed at one surface of the cam drive member 119, and the cam groove 146 is defined by radially inward and outward cam surfaces 148 and 150, respectively. These two surfaces 148 and 150 are arranged so that these have a constant width dimension so that the cam followers 120 and 140 (which are in the form of wheels or rollers) can properly move through the entire cam groove 146. The cam groove 146 comprises, in terms of function, four sections.

First, there are two 90° constant radius sections 152 and 154, with the groove portion 152 having a shorter radius relative to the radius of the groove section 154. These two groove sections 152 and 154 are positioned so as to be diametrically opposite from one another. Then, there are two 900 transition sections 156 and 158 that are also positioned so as to be diametrically opposed from one another, and (as their name infers) they make the transition between the shorter radius position and the longer radius position.

Reference will now be made back to FIG. 16, and there is shown in broken lines the two transition portions 156 and 158. In FIGS. 15, 17, and 18, those transition portions are shown by straight line portions, again, this being done only for ease of illustration.

To describe the sequence of operation, reference is made first to FIG. 15. In this position, with the cam follower 152 is at the location of the smaller radius portion 152 of the cam groove 146, so that at that time there is no horizontally aligned motion of the carriage 106. However, the cam follower 140 is in a transition portion of the cam groove 146, and the radius from the cam follower 140 to the center of rotation 144 is decreasing, which mean that the rollers 136 are descending. Thus, in that position the overall motion of the carriage 106 is to continue a downward movement.

Now to move on to FIG. 16, it can be seen that the cam drive member 119 has rotated 90° from FIG. 15, and the cam follower 140 is now positioned at the middle of the constant curvature smaller diameter portion 152 of the cam groove 146. Therefore, the platform conveying elements 24*b* are at their lowest elevation. The other cam follower 120 is in an intermediate position on the variable cam follower portion 156, and is thus being moved horizontally toward the left, as seen in FIG. 16.

In FIG. 17, the cam drive member 119 has rotated another 90°0, and it can be seen that the rearward motion of the platform conveying elements 24*b* has been completed, and also that these conveying elements 24*b* are in the middle of being raised upwardly, this being due to the cam follower 140 moving away from the center of rotation 144.

In FIG. 18, the cam drive member 119 is moved another 90° from FIG. 17, and in this position the conveying element 24 is at its highest position where it is carrying a food product, and is part-way through its forward increment of travel to carry the food product through that increment of travel in the oven.

With another 90° of rotation of the cam drive member 119, the conveying elements 24*b* have reached their forward limit of travel and part-way through their downward movement so that the food product would then be resting on the stationary platform elements 24*a*.

Figure 21:
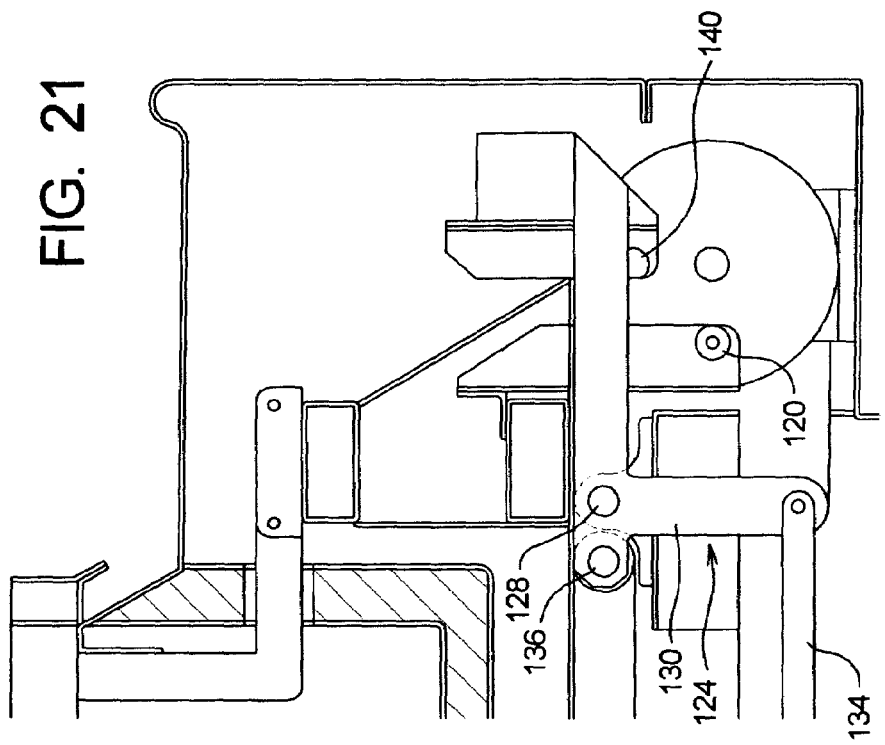
FIGS. 21–22 are side elevational views, partly in section of forward and rear portions of the oven illustrating components of the drive mechanism in an actual operating apparatus.
Figure 22:
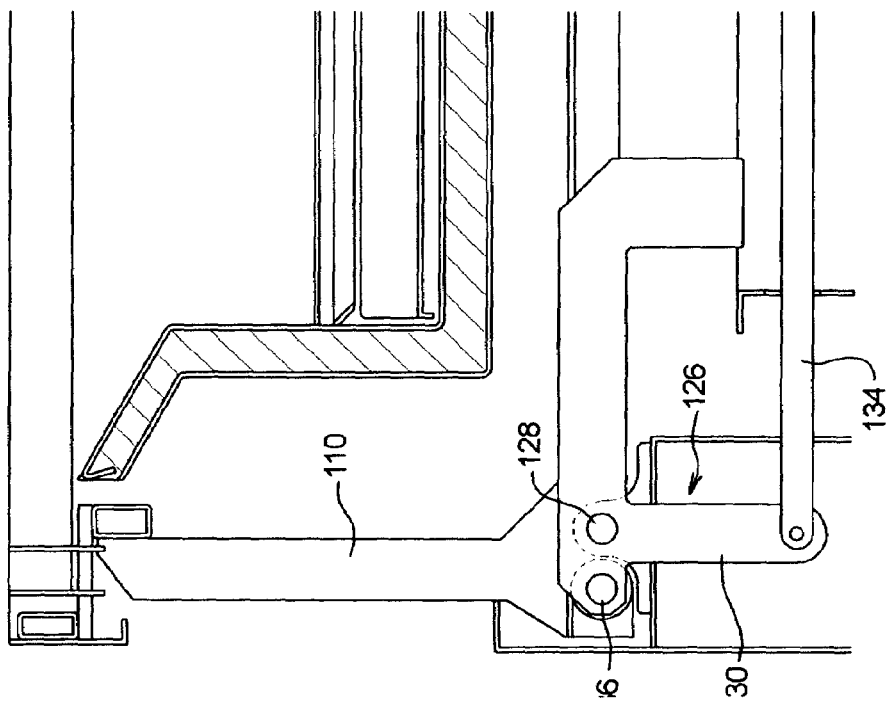

FIGS. 21 and 22 show the front and rear portions of the drive mechanism 104 along with various other components of the oven. In FIGS. 21 and 22, numerical designations are given only to those components relating to this drive mechanism, and the representations in FIGS. 21 and 22 are given mainly to illustrate how the drive mechanism 104 could be positioned in an actual oven.

Figure 23:
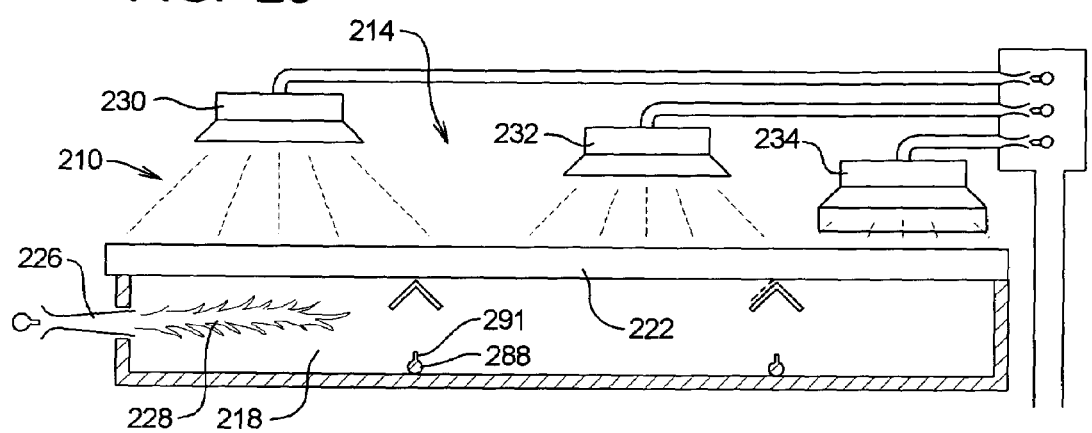
FIG. 23 is a side elevational view partly in section illustrating somewhat schematically a further embodiment of the oven.

Reference is now made to FIG. 23, which shows a further embodiment of present invention. There is an oven 210, shown somewhat schematically in FIG. 23, where there is a cooking chamber 214 and a lower burner section 218. A platform section 222 is positioned at the lower part of the chamber 214 and above the burner section 218. This platform section 222 has the stationary platform elements and the moveable conveying platform elements 263, such as shown in FIGS. 10 and 11. The burner section 218 comprises a plurality of heating sections 288 having the heating elements 291.

In addition, there is provided an additional heating element 226 which is positioned at the rear entry of the heating chamber 218. As shown herein, this element 226 ejects a flame laterally at 228. In addition, a similar heating element 226 could be employed at the opposite end of the oven.

Located above the platform section 222, are three infrared heaters, namely a rear heater 230, a central heater 232, and a forward heater 234. It will be noted that each of these heaters 230–234 are at a different elevation above the platform 222. The infrared heat is emitted in an expanding pattern. Accordingly, the intensity of the heat from the heater 230 is less, with the intensity of the heat from the infrared heater 232 being greater, and the intensity of the most forward infrared heater 234 being the greatest.

When pizzas are being cooked, these are introduced into the left-hand side of the oven as seen in FIG. 23. The temperature of the surface of the platform 222 is relatively high, which is estimated to be possibly in the order of 400° F.–500° F., or possibly even higher, so therefore the crust at the bottom of the pizza has its temperature raised rather quickly. However, the contour of a pizza is generally such that the dough in the main central part of the pizza is made thinner, and the dough around the perimeter has a greater depth dimension (i.e., thicker). It is desired that the dough around the crust be maintained at a temperature not to exceed 140° F. to allow the yeast to remain active, so that the perimeter crust of the pizza can rise before the baking is completed.

Then, as the pizza proceeds toward the middle of the oven, a greater intensity of heat would be applied, and at the very end of the travel of the pizza through the oven, the heat would be most intense to bring the food components of the pizza at the upper surface to a yet higher temperature level.

Figure 24:
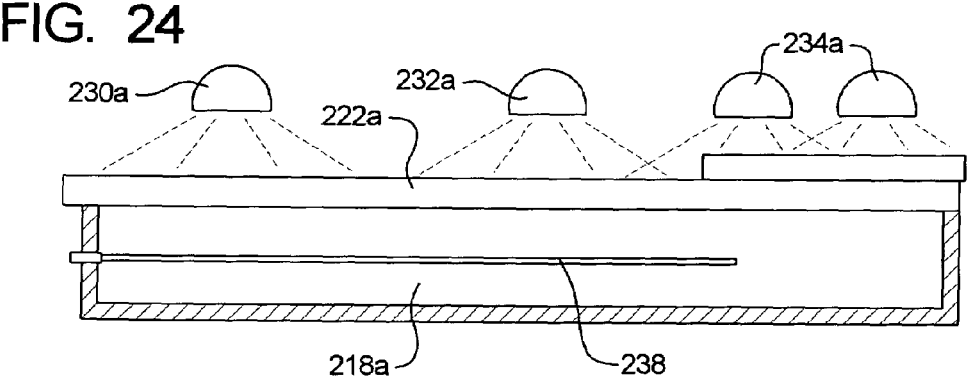
FIG. 24 is a view similar to FIG. 23, showing a somewhat modified version of the oven shown in FIG. 23.

FIG. 24 has a similar arrangement as in the oven of FIG. 23. Components of this embodiment of FIG. 24 which are the same as or similar to those of FIG. 23, will be given like numerical designation with an "a" suffix distinguishing those in the embodiment of FIG. 24. In FIG. 24, there is the lower heating section 218*a* and the platform section 222*a*. In this instance, there is the rear infrared heater 230*a* and the central heater 232*a*, but the more forward infrared heater is in the form of two heaters 232*a* which are closer together and thus having overlapping regions of radiation striking the pizza. All of these heaters are at the same level. This gives a generally similar heating pattern to that described in FIG. 23 because of the greater intensity provided by the more forward heaters 234*a*.

Also, in FIG. 24, instead of using the flame heaters of the embodiment of FIG. 23, electrically powered heaters 238 are employed.

In general, it is desirable that there be a greater intensity of heat at the upper surface of the platform 22 along substantially its entire length, while it would generally be desirable to have the heat applied from above the pizza or other food product be variable or applied differentially in the manner described above. Further, the selection of the platform elements which are used will depend to a large extent on getting the optimized application of the heat.

With the platform elements 24*a* and 24*b* of the first embodiment described herein, having the stone filler within the platform elements, the rate of heat transfer through the stone would be somewhat slower than in the embodiment shown in FIGS. 10 and 11. It may be that one type of construction of the platform elements 24 could be used in one portion of the oven and another type in another part of the oven.

It is to be understood that various modifications could be made in the present invention without departing from the basic teachings thereof.

What is claimed is:

1. A conveying oven comprising:
    a) a housing defining a cooking chamber having a longitudinal axis, a rear entry portion, and a front discharge portion;
    b) a conveying platform comprising a plurality of elongate platform elements aligned longitudinally in said cooking chamber,
        a first portion of said platform elements being stationary, and a second portion of said platform elements being positioned laterally in an alternating relationship with the stationary platform elements and being movable in a manner that the moveable conveying elements are raised in a food carrying position, moved forward through an increment of travel, then lowered out of engagement with a food product, moved rearwardly, and then again raised to engage the food product and move forwardly another increment of forward travel;
    c) a lower heating section positioned below said platform and supplying heat to said platform;
    d) an upper heating section positioned in said chamber and comprising a plurality of infrared heaters directing infrared heat toward food product on said conveying platform;
    said infrared heaters being arranged so that heat at different intensities is directed at different locations on the platform in a manner that the sequence of heating is controlled so that the food product traveling through the cooking chamber is exposed to greater and lesser intensities of heat at locations along the conveying platform to achieve a desired sequence of cooking conditions for food passing progressively through the cooking chamber.

* * * * *